(12) United States Patent
Gao et al.

(10) Patent No.: US 9,558,245 B1
(45) Date of Patent: Jan. 31, 2017

(54) AUTOMATIC DISCOVERY OF RELEVANT DATA IN MASSIVE DATASETS

(71) Applicant: International Business Machines Corporation, Armonk, NY (US)

(72) Inventors: Lei Gao, Xian (CN); Sier Han, Xi'an (CN); Jing Xu, Xian (CN); Ji Hui Yang, Xian (CN); Zongyao Zhang, Xian (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/960,757

(22) Filed: Dec. 7, 2015

(51) Int. Cl.
*G06F 17/30* (2006.01)
(52) U.S. Cl.
CPC ... *G06F 17/30539* (2013.01); *G06F 17/30528* (2013.01); *G06F 17/30598* (2013.01)
(58) Field of Classification Search
CPC ................................. G06F 3/0626; G06F 7/14
USPC .................................................. 707/725, 705
See application file for complete search history.

(56) References Cited

U.S. PATENT DOCUMENTS

| 7,426,520 | B2 | 9/2008 | Gorelik et al. | |
|---|---|---|---|---|
| 8,429,527 | B1* | 4/2013 | Arbogast | G06Q 10/0633 715/200 |
| 8,805,857 | B2 | 8/2014 | Bhammar et al. | |
| 8,874,613 | B2 | 10/2014 | Gorelik et al. | |
| 2007/0073645 | A1 | 3/2007 | Belyy et al. | |
| 2007/0156734 | A1* | 7/2007 | Dipper | G06F 17/30286 |
| 2013/0006998 | A1* | 1/2013 | Shyr | G06F 17/30321 707/741 |
| 2014/0059017 | A1 | 2/2014 | Chaney et al. | |
| 2014/0059056 | A1 | 2/2014 | Chaney et al. | |
| 2016/0055205 | A1* | 2/2016 | Jonathan | G06F 17/30454 707/714 |
| 2016/0055212 | A1* | 2/2016 | Young | G06F 17/30498 707/723 |

OTHER PUBLICATIONS

Reshef et al., "Detecting Novel Associations in Large Data Sets", Science 334, 1518 (2011), DOI: 10.1126/science.1205438, Dec. 16, 2011 vol. 334 SCIENCE, 8 pages.

* cited by examiner

*Primary Examiner* — Hosain Alam
*Assistant Examiner* — Robert F May
(74) *Attorney, Agent, or Firm* — Gilbert Harmon, Jr.

(57) ABSTRACT

An approach for discovery of relevant data in massive datasets. Compare datasets including compare key fields, compare data fields and a core dataset including target data field(s) and core field(s) are received. The compare datasets are categorized into direct and indirect related dataset pools based on the target data field(s) correlation strength with matching compare and core fields. The direct related dataset pool and the core dataset are transformed into reduction datasets based on statistical measure of values of target data fields, shared key fields and compare data fields. Target correlations of the reduction datasets are creating based on a reduction compare and target data fields. Statistical relationship strength of core dataset and the direct related dataset pool are created based on a statistical mean of target correlations and a relevancy data store is created.

18 Claims, 5 Drawing Sheets

| Compare data field | target correlation | Key Field | Top_N Mean | Core Db |
|---|---|---|---|---|
| A1 | 0.98 | D1: X1 | 0.97 | D0:Y |
| A2 | 0.97 | D1: X1 | | D0:Y |
| A2 | 0.96 | D1: X2 | | D0:Y |
| A1 | 0.43 | D1: X2 | 0.0 | D0:Y |
| Threshold: 0.5 | | | | |

AUTOMATIC DISCOVERY OF RELEVANT DATA IN MASSIVE DATASETS

BACKGROUND OF THE INVENTION

The present invention relates generally to the field of database data analytics and more particularly to determining statistically similar related data in a structured dataset pool.

Data analytics focuses on searching data files to discover business insights. When target data (core data) and specified target field(s) are selected for data mining and analysis there may be additional relevant information in other related datasets beyond the target data dataset.

Analyzing datasets for relevant data of interest can be a manual effort of investigating each possible related dataset for relevancy by comparing each data with the core data and joining them together as a single source for the subsequent data analysis. With massive datasets, data information is stored in various sources and the ability to discover relevant target data with other datasets becomes complex as the quantity of data sources and/or datasets increases.

SUMMARY

As disclosed herein, a method for discovery of relevant data in massive datasets, the method comprising: receiving one or more compare datasets wherein the one or more compare datasets comprises one or more compare key fields and one or more compare data fields; receiving a core dataset wherein the core dataset comprises one or more target data fields and one or more core key fields; matching at least one field name of the one or more compare key fields, the one or more compare data fields and the one or more core key fields wherein matching is one or more target key field candidates; determining one or more shared key fields based on a correlation of the one or more target key field candidates and the one or more target data fields; categorizing the one or more compare datasets into a direct related dataset pool and an indirect related dataset pool wherein the direct related dataset pool comprises one or more compare datasets comprising at least one of the one or more shared key fields; transforming the direct related dataset pool and the core dataset into one or more reduction datasets based on a statistical measure of values of the one or more target data fields, the one or more shared key fields and the one or more compare data fields; creating one or more target correlation of the one or more reduction datasets based on one or more reduction compare data fields and one or more reduction target data fields; creating one or more statistical relationship strength of the core dataset and the direct related dataset pool based on a statistical mean of the one or more target correlation of the one or more reduction datasets and creating a relevancy data store wherein the relevancy data store comprises the one or more statistical relationship strength, the one or more target correlation, the one or more compare data fields and the one or more shared key fields associated with the core dataset and the direct related dataset pool. A computer system and a computer program product corresponding to the above method are also disclosed herein.

DETAILED DESCRIPTION

In the field of data analytics, researching information about a target within a primary dataset (core data) involves discovery of relevant data with other datasets from a mass of data sources and/or a dataset pool. Embodiments of the present invention provide systems, methods and computer program products for reducing dataset content and scoring statistical correlations to determine relevant data to a target and outputting a consolidated analysis for probabilistic decision making.

Embodiments of the present invention use statistical evaluation criteria to discover relevant data in massive datasets for target data contained in a core dataset. A massive dataset pool can comprise a plurality of datasets ranging from dozens to thousands (or larger). Datasets in a massive dataset pool are categorized when target field(s) in a core dataset are compared to the dataset pool. Data in a dataset pool can closely correlate to a target where other data does not. To find and fully utilize relevant data from each dataset in a dataset pool, embodiments of the present invention leverage metadata in a data dictionary to analyze a dataset pool. Metadata is "data about data" and is contained in a data dictionary managed by a database management system (DBMS). Metadata comprises information about a dataset such as, but not limited to, field data type (e.g., numeric, text) and key field indicator. A key field (indicated in metadata) is a field that contains a unique value within a column of key fields and one or more columns of key fields enables the ability to join relational datasets. Other fields in metadata not indicated as key fields are characterized as data fields.

Embodiments of the present invention, search for matching key field names in core dataset key fields with a plurality of compare datasets fields in a dataset pool. If core dataset key field(s) names are shared (i.e., match) between the core dataset and a compare dataset then the matching fields are characterized as target key field candidate(s). Field values of each target key field candidate(s) are correlated with the core dataset target field(s). It should be noted that embodiments of the present invention classify field data types as numeric and text. The correlation methods used and known by one skilled in the art are: (1) Pearson correlation for numeric vs. numeric, (2) Eta square for numeric vs. text and (3) Chi-square for text vs. text. The top 'N' statistically strong correlation values of target key field candidate(s) are characterized as shared key fields. A statistically strong correlation value is defined by a predetermined threshold value that a correlation value exceeds. Top 'N' is defined by a predetermined quantity or count, to filter output and determine shared key fields. With shared key fields identified, each compare dataset in a dataset pool comprising at least one shared key field is identified as a 'direct related dataset', otherwise the dataset is identified as 'indirect related dataset.' Each direct related dataset is included in a direct related dataset pool analysis and each indirect related dataset is processed with respect to each direct related dataset in an indirect related dataset pool analysis. Correlation statistics of a core dataset target field(s) relevancy are determined for direct related datasets and indirect related datasets and output to identify statistically strong relevant datasets based on the target field(s).

Embodiments of the present invention will now be described in detail with reference to the figures. It should be noted that, references in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
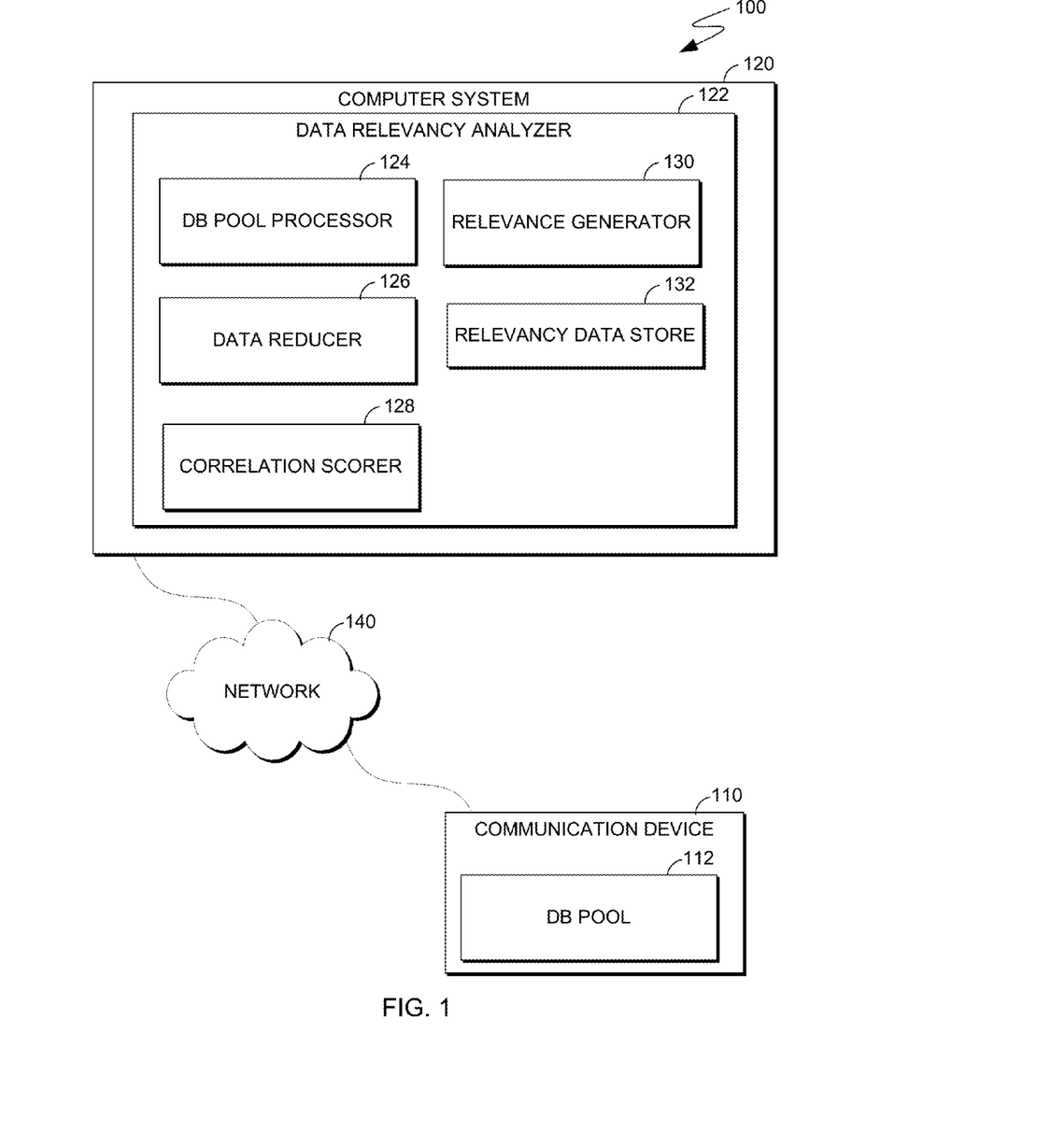
FIG. 1 is a functional block diagram illustrating a computing environment, in accordance with an embodiment of the present invention.

FIG. 1 is a functional block diagram of computing environment 100, in accordance with an embodiment of the present invention. Computing environment 100 comprises communication device 110, and computer system 120, interconnected via network 140. Communication device 110 and computer system 120 can be desktop computers, laptop computers, specialized computer servers, or the like. In certain embodiments, communication device 110 and computer system 120 represent computer systems utilizing clustered computers and components acting as a single pool of seamless resources via network 140. For example, such embodiments can be used in data center, cloud computing, storage area network (SAN), and network attached storage (NAS) applications. In general, communication device 110 and computer system 120 are representative of any electronic devices, or combination of electronic devices, capable of executing computer readable program instructions, as described in detail with regard to FIG. 5.

Network 140 can be, for example, a local area network (LAN), a wide area network (WAN) such as the Internet, or a combination of the two, and include wired, wireless, or fiber optic connections. In general, network 140 can be any combination of connections and protocols that will support communications between communication device 110 and computer system 120, in accordance with an embodiment of the present invention.

Communication device 110 comprises db pool 112. Db pool 112 comprises a plurality of datasets operated on by embodiments of the present invention. In one embodiment of the present invention, db pool 112 can be a plurality of db pool 112 within communication device 110.

In one embodiment of the present invention, computer system 120 comprises data relevancy analyzer 122. Data relevancy analyzer 122 comprises db pool processor 124, data reducer 126, correlation scorer 128, relevance generator 130 and relevancy data store 132. Data relevancy analyzer 122 further comprises any combination of commercial or custom software products (not shown) associated with operating and maintaining data relevancy analyzer 122. It should be noted that, data relevancy analyzer 122 can be implemented as an integrated or distributed application.

In one embodiment of the present invention, db pool processor 124 can be a plurality of db pool processors 124 within data relevancy analyzer 122. Db pool processor 124 receives target field(s) and a core dataset to analyze with received db pool 112. Db pool processor 124 identifies target key field candidate(s), filters a correlated list of target key field candidate(s), identifies shared key field(s) and categorizes db pool 112 datasets as one of a direct related dataset and indirect related dataset. Db pool processor 124 sends results such as, but not limited to, core dataset id, compare dataset id and shared key field list toward relevancy data store 132. For example, a core dataset (D0) comprises key fields X1, X2 and X3 and compare dataset (D1) comprises shared key fields X1 and X2. Compare dataset D1 is categorized as a direct related dataset in this example as target key field candidates X1 and X2 matched core key field names X1 and X2 and were determined to have target field(s) correlation values meeting predetermined top N correlation strength criteria.

In one embodiment of the present invention, data reducer 126 can be a plurality of data reducers 126 within data relevancy analyzer 122. Data reducer 126 processes each shared key field to transform data and creates a reduction dataset comprising data such as, but not limited to, target field(s), shared key field and compare data field(s). The data in each field are reduced to a statistical mean or statistical mode based on the associated shared key field value. Data reducer 126 sends the reduction data toward relevancy data store 132.

In one embodiment of the present invention, correlation scorer 128 can be a plurality of correlation scorers 128 within data relevancy analyzer 122. Correlation scorer 128 processes each reduction dataset result determined by data reducer 126. The target field(s) value is correlated with each compare data field(s) to determine the strength of relationship of each data with the target field(s) value. Correlation scorer 128 also identifies the top 'N' statistically strong correlation values. For example, the top 3 correlation values (N equals 3) exceeding 0.5 (threshold equals 0.5) can be identified as statistically relevant. Correlations are computed between target field(s) and compare field using methods such as, but not limited to, Pearson correlation, Eta square and Chi-square. Correlation scorer 128 sends results toward relevancy data store 132. For example, correlation scorer 128 sends correlation data such as, but not limited to, compare data field(s), target field(s) correlation, core dataset identifier and compare dataset identifier, toward relevancy data store 132.

In one embodiment of the present invention, relevance generator 130 can be a plurality of relevance generators 130 within data relevancy analyzer 122. Relevance generator 130 calculates the top 'N' correlation values for each reduction direct and/or indirect related dataset to determine a combined compare dataset relevance strength with the target field(s). Relevance generator 130 sends data such as, but not limited to, top 'N' mean correlation, toward relevancy data store 132.

In one embodiment of the present invention, relevancy data store 132 can be a plurality of relevancy data stores 132 within data relevancy analyzer 122. Relevancy data store 132 stores calculation results from db pool processor 124, data reducer 126 correlation scorer 128 and relevance generator 130. The relevance strength data in relevancy data store 132 can be used to output probable relationships to the target field(s) and allow discovery of extensive data relevancy of target information.

Figure 2:
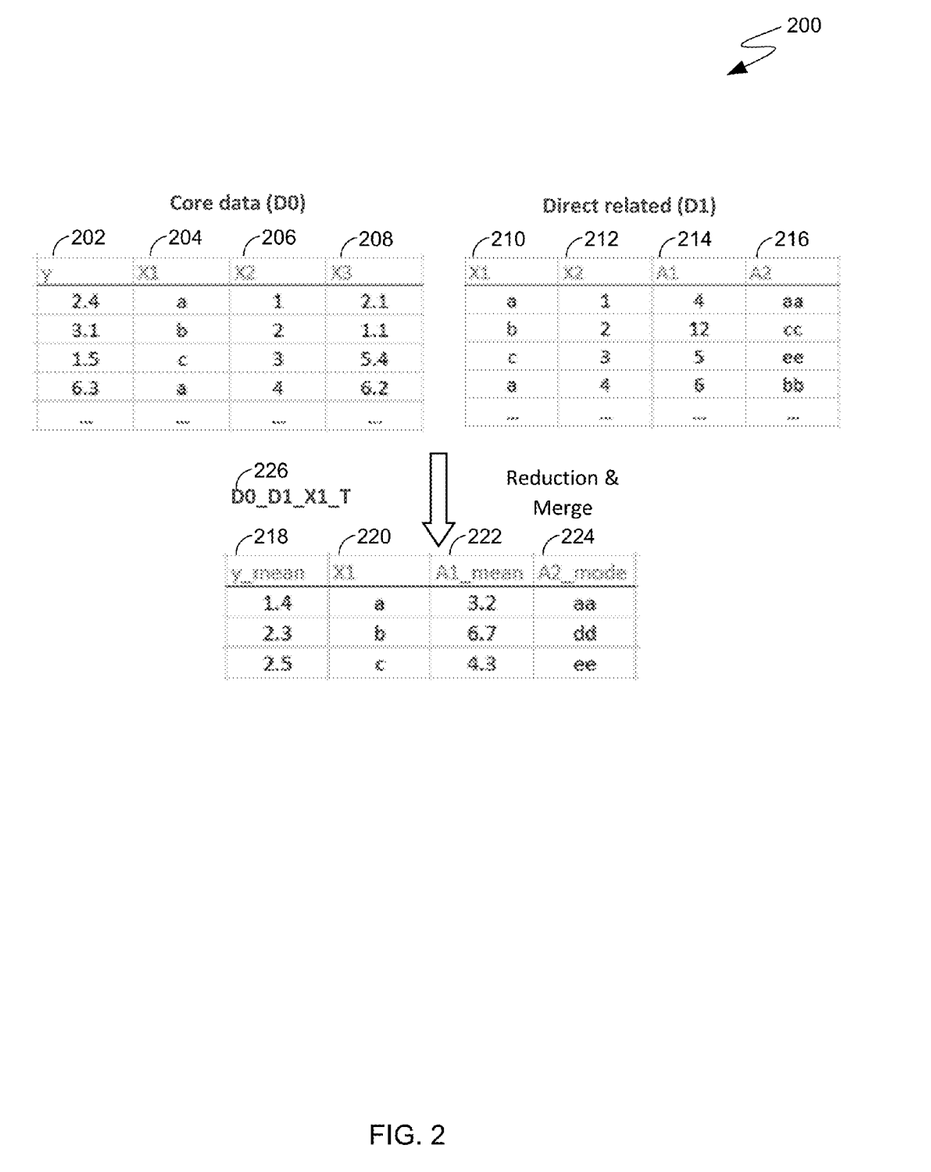
FIG. 2 depicts a sample of a dataset comparison reduction, in accordance with an embodiment of the present invention.

FIG. 2 depicts a sample of a dataset comparison reduction, in accordance with an embodiment of the present invention. The dataset comparison reduction sample 200 represents one embodiment of the present invention. Heading 202 $y$ is the target field(s) used to find correlation and determine statistical correlation to datasets and fields in a dataset pool. Heading 204 X1 (D0), heading 206 X2 (D0) and heading 208 X3 (D0) are key field identifiers for core dataset D0. Heading 210 X1 (D1) and heading 212 X2 (D1) are compare dataset shared key fields with heading 204 X1 (D0), heading 206 X2 (D0) respectively. Note, heading 208 X3 (D0) has no corresponding X3 field in compare dataset D1 as X3 does not exist and/or was not determined to be a shared key field by db pool processor 124. Heading 214 A1 and heading 216 A2 are direct related dataset compare data field(s) in dataset D1.

The reduction of data in core dataset D0 and compare dataset D1 are joined based on the shared key field X1 in core dataset D0 and compare dataset D1 (heading 220 X1 (D0_D1)). Item 226 Reduction dataset identified by 'D0_D1_X1_T' comprise results produced by data reducer 126. Heading 218 y_mean is a reduced target field(s) based on calculating the statistical mean of data in heading 202 y for each categorical value of merged data in heading 220 X1 (D0_D1). Heading 220 X1 (D0_D1) contains the joined unique values from data in heading 204 X1 (D0) and heading 210 X1 (D1). Heading 222 A1_mean is a reduction of data in heading 214 A1, calculated as the statistical mean for each data in heading 220 X1 (D0_D1). Heading 224 A2_mode is a reduction of data in heading 216 A2, calculated as the statistical mode for each data in heading 220 X1 (D0_D1). It should be noted that Item 226 Reduction dataset represents shared key field heading 220 X1 (D0_D1). Data reducer 126 produces a reduction dataset for each shared key field in a compare dataset. It should be noted, to complete reduction of compare dataset D1, shared key fields heading 206 X2 (D0) and heading 212 X2 (D1) is processed (not depicted).

Figure 3A:
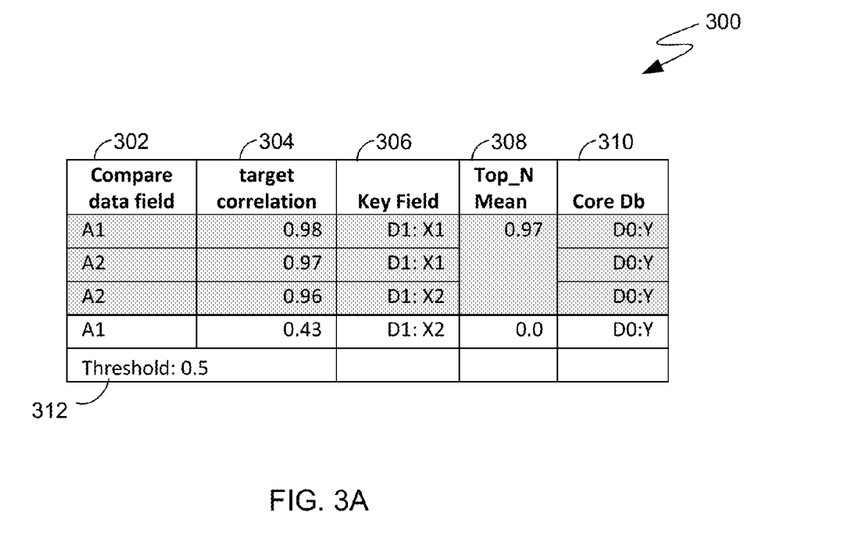
FIG. 3A, B depicts a sample of dataset correlation results, in accordance with an embodiment of the present invention.

FIG. 3A depicts a sample of dataset correlation results, in accordance with an embodiment of the present invention. The dataset correlation sample 300 represents one embodiment of the present invention. Heading 302 Compare data field comprises identifiers of compare data field(s) (e.g., heading 214 A1 and heading 216 A2). Heading 304 target correlation is the correlation value of reduction target field(s) heading 218 y_mean with associated reduction compare data field(s) (e.g., heading 222 A1_mean, heading 224 A2_mode).

Heading 306 Key Field is an identifier of a shared key field and a compare dataset related to a heading 304 target correlation value.

Heading 308 Top_N Mean is the calculated statistical mean of correlation values in heading 304 target correlation for values that pass a predetermined threshold correlation value determined by relevance generator 130. Note that heading 308 Top_N Mean is a calculated dataset level relationship strength value between the core dataset and an associated compare dataset passing a predetermined threshold correlation value.

Heading 310 Core Db is an identifier of the core dataset and target field used to calculate values in heading 304 target correlation.

Heading 312 Threshold is a reference to a predetermined threshold used to select values in heading 304 target correlation that are used to calculate the values in heading 308 Top_N Mean by relevance generator 130. Note, heading 302 Compare data field value 'A1' is not selected for heading 306 Key Field value 'D1:X2' as heading 304 target correlation value 0.43 is below heading 312 Threshold of 0.5. Heading 308 Top_N Mean is value 0.97 for heading 304 target correlation values (i.e., selected) passing heading 312 Threshold value of 0.5 in compare dataset D1.

Figure 3B:
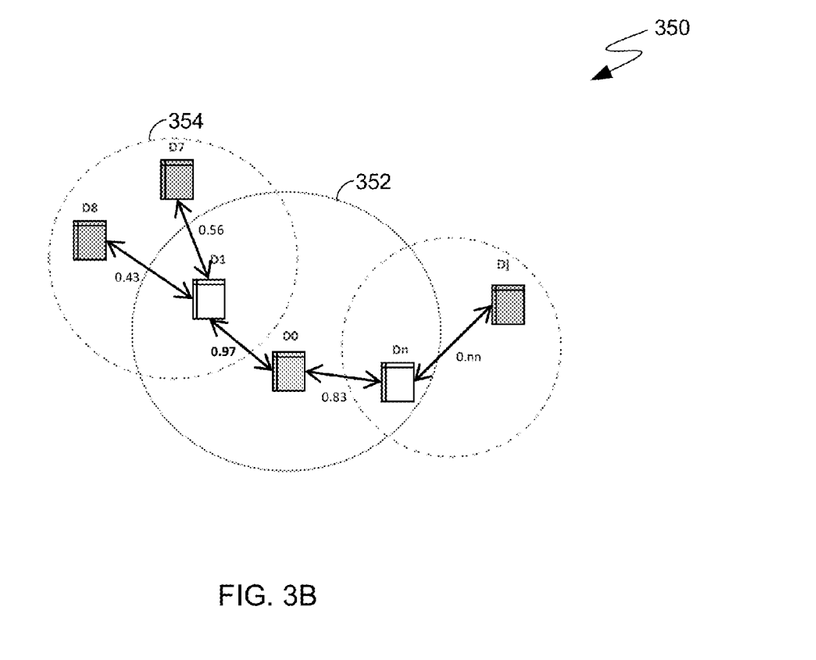

FIG. 3B depicts a sample graphical representation of dataset correlation results, in accordance with an embodiment of the present invention. The data relevance graphic 350 represents one embodiment of the present invention. The data relevance graphic 350 is an example of output after direct related datasets and indirect related datasets are processed by embodiments of the present invention. Item 352 direct dataset network depicts direct related datasets statistical strength compared to a core dataset. Item 354 indirect dataset network depicts indirect related dataset statistical strength compared to each direct related dataset. Note, that the quantity of item 354 indirect dataset network is based on the number of direct related datasets (e.g., 'Dn' where n is any number of direct related datasets). Further, the quantity of datasets in item 354 indirect dataset network is based on the number of indirect related datasets (e.g., 'Dj' where j is any number of indirect related datasets).

Figure 4:
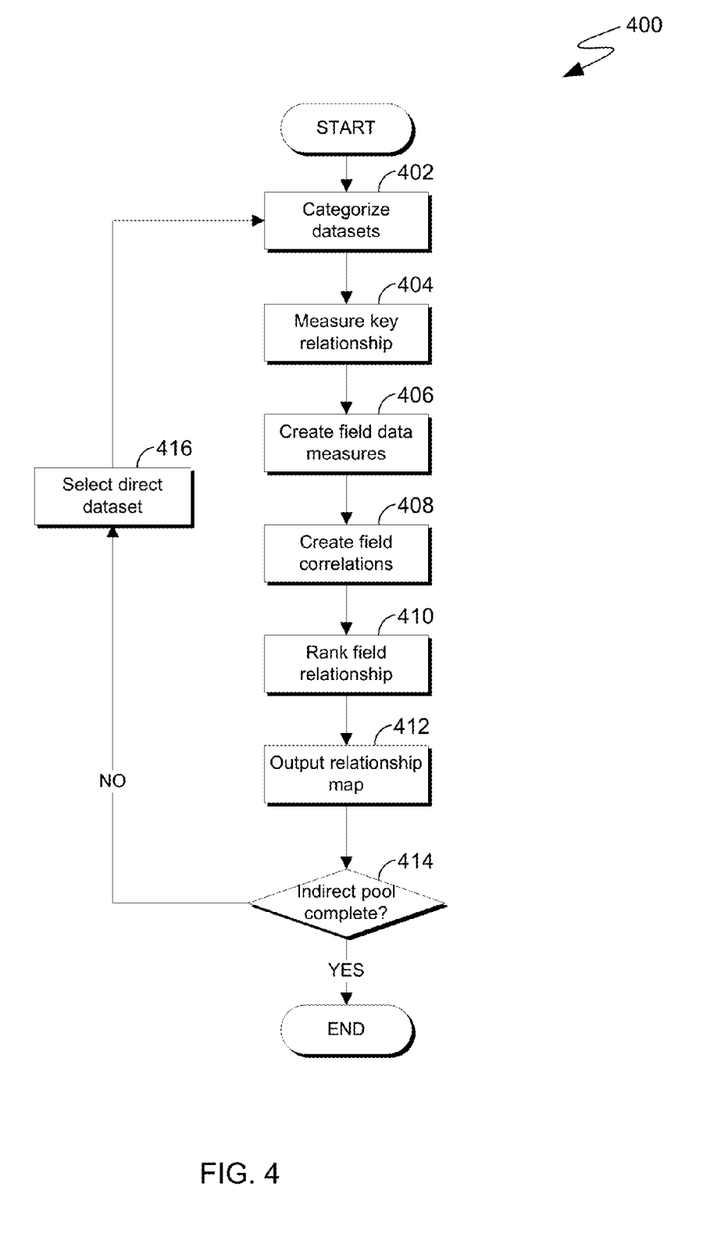
FIG. 4 is a flowchart depicting dataset relationship strength determiner, in accordance with an embodiment of the present invention.

FIG. 4 is a flowchart depicting dataset relationship strength determiner, in accordance with an embodiment of the present invention. Step 402 Categorize datasets in flow diagram 400 dataset relationship strength determination receives target field(s) in a core dataset and a compare dataset pool (db pool 112) to process. Step 402 Categorize datasets collects the fields in the data dictionary (metadata) for the datasets to compare in the dataset pool. Each compare dataset field is compared to the core dataset key field. If a compare dataset field name matches a core dataset key field then the matching field(s) are identified as target key field candidate(s). Field values of each target key field candidate(s) are correlated with the target field(s). The statistically strong, top 'N' fields are identified as shared key field(s). The compare datasets comprising shared key field(s) are categorized as direct related dataset(s) in a direct related dataset pool. If no shared key field(s) are found in the compare dataset then the compare dataset is categorized as an indirect related dataset in an indirect related dataset pool.

In step 404 Measure key relationship, the correlation of target field(s) values and associated compare dataset shared key field values are calculated and the correlation value(s) are sent toward relevancy data store 132. Step 404 Measure key relationship continues for each compare dataset shared key field in the direct related dataset pool (e.g., heading 210 X1 (D1), heading 212 X2 (D1)). The correlation values are sorted for each compare dataset in the dataset pool and the top 'N' statistically strong correlation values are filtered as referenced previously.

Step 406 Create field data measures uses the target field(s) (e.g., heading 202 y) and the related compare data field(s) (e.g., heading 214 A1, heading 216 A2) that are joined by each shared key field (e.g., heading 220 X1 (D0_D1)) to statistically reduce target field(s) and compare data field(s). For each compare data field, a data value is calculated for data contained in each column based on the type of data in the shared key field and the compare data field(s). The three types of data considered to be in a shared key field are, (1) unique ID type, (2) categorical type and (3) continuous type. When the shared key field type is unique ID type, the data value is calculated as a statistical mean, statistical mode or discrete value according to each unique ID number and data type of the related compare data field. When the shared key field type is categorical type, for every categorical level, a statistical mean data value is calculated if the related compare data field is continuous type, otherwise a mode data value is calculated. When the shared key field type is continuous type, for every percentile level of the shared key field, a statistical mean data value is calculated if the related compare data field is continuous type, otherwise a mode data value is calculated. A reduction dataset is created for each shared key filed and is sent toward relevancy data store 132. For example, core data (D0) dataset with shared key field X1 (e.g., heading 204 X1 (D0)) matching compare dataset (D1) (e.g., heading 210 X1 (D1)) could be saved as D0_D1_X1_T (e.g., item 226 Reduction dataset). The reduction dataset D0_D1_X1_T can contain statistical mean and/or statistical mode values for the target field (e.g., heading 218 y_mean) from core dataset D0 and statistical mean and/or statistical mode for respective compare data field(s) in compare dataset D1 (e.g., heading 222 A1_mean, heading 224 A2_mode) for each shared key field value (e.g., heading 220 X1 (D0_D1)).

Step 408 Create field correlations is performed for each reduction dataset. A correlation calculation is performed on each reduction compare data value in relation to a corresponding reduction target field(s). For example, step 408 Create field correlations processes reduction dataset item 226 Reduction dataset D0_D1_X1_T and uses target data values in heading 218 y_mean to compute correlation statistics for corresponding data values in heading 222 A1_mean and heading 224 A2_mode. The results represent the correlation relationship (i.e., relevancy strength) of each compare data field with the target field(s) (e.g., heading 304 target correlation). The correlation results are sorted and the top 'N' statistically strong related fields are filtered as referenced previously.

In step 410 Rank field relationship, a statistical mean of identified statistically strong correlations of each compare dataset is calculated (e.g., heading 308 Top_N Mean). The correlation mean of the correlation values reduces the correlation strength of a core dataset and compare dataset to a single value. Each reduction dataset is processed to produce a dataset relationship strength with respect to the core dataset target field(s). It should be noted that compare datasets categorized as direct related dataset can be found to be unrelated (i.e., having a substantially zero correlation) and those unrelated dataset(s) can be re-categorized as an indirect related dataset to be reprocessed with the indirect related dataset pool.

Step 412 Output relationship map sends the ranked relationship datasets results toward relevancy data store 132 for use and presentation of analysis results (e.g., dataset correlation sample 300). The relationship data can comprise, but is not limited to, compare data field(s), target field(s) correlation, top 'N' mean correlation, compare dataset identifier and core dataset identifier. The relationship of each dataset with respect to the target field(s) can be presented as needed based on implementation (e.g., data relevance graphic 350).

Step 414 Indirect pool complete, creates a loop to process each direct related dataset as a next core dataset with respect to the indirect related dataset pool. This process is similar to the core dataset processing with the direct related dataset pool. Once each direct related dataset in the direct related dataset pool is processed as a core dataset with respect to the indirect related dataset pool then processing ends. It should be noted that multiple levels of indirect related pool processing can be performed using embodiments of the present invention beyond two level processing depicted in diagram 400 dataset relationship strength determination. Further, some embodiments of the present invention can omit processing of the indirect related dataset pool. It should also be noted that a processing threshold can be implemented based on the correlation strength of each direct related dataset relationship to the core dataset to omit processing of statistically weak direct related datasets during indirect related dataset processing.

Step 416 Select direct dataset identifies direct related datasets that have not been processed as a core dataset. Step 416 Select direct dataset, selects an unprocessed direct related dataset and sends the direct related dataset toward step 402 Categorize datasets to be processed as a 'core' dataset. It should be noted that dataset relationship discovery can be optimized by sequencing direct related dataset selection based on statistically strong to weak relationship measures with the core dataset. In the flow branch for processing indirect related datasets, step 402 Categorize datasets uses the direct related dataset top N data fields found in reduction data. The direct related dataset top N data fields of the direct related dataset are matched with each indirect related dataset field to determine target key field candidate(s) similar to core dataset key field comparisons in the direct related dataset pool processing. In the indirect related dataset pool processing loop step 402 Categorize datasets can further categorize indirect related datasets to additional levels of indirect related dataset pool based on identified shared key field(s). It should be noted that the target field(s) used in direct related dataset processing are used during indirect related dataset processing loop to identify shared key field(s). Step 404 Measure key relationship, step 406 Create field data measures, step 408 Create field correlations, step 410 Rank field relationship and step 412 Output relationship map process similar to direct related dataset processing loop. Step 412 Output relationship map contains dataset relationships measures for each dataset processed in each loop to provide the ability to depict multiple correlated levels of relationship strength. For example, heading 310 Core Db can contain 'D1:A1' as an identifier if the direct related dataset 'D1' is joined to an indirect related dataset 'D8' with shared key field 'A1' (e.g., item 354 indirect dataset network).

Figure 5:
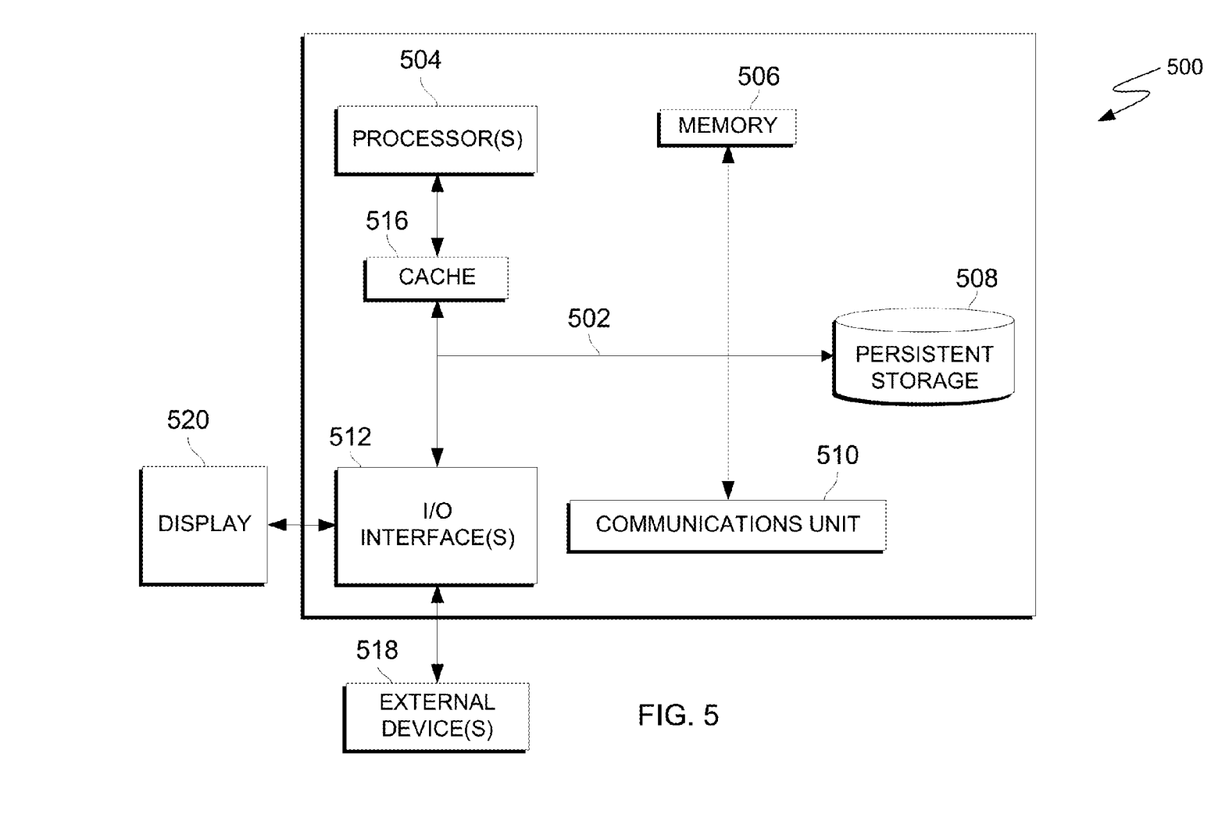
FIG. 5 depicts a block diagram of components of the server and/or the computing device, in accordance with an embodiment of the present invention.

FIG. 5 depicts a block diagram of components of communication device 110 and computer system 120 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer system 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Computer system 500 includes processors 504, cache 516, memory 506, persistent storage 508, communications unit 510, input/output (I/O) interface(s) 512 and communications fabric 502. Communications fabric 502 provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for discovery of relevant data in massive datasets, the method comprising:
   receiving, by data relevancy analyzer, one or more compare datasets wherein the one or more compare datasets comprises one or more compare key fields and one or more compare data fields;
   receiving, by the data relevancy analyzer, a core dataset wherein the core dataset comprises one or more target data fields and one or more core key fields for determining data relevancy with the one or more compare datasets;
   matching, by the data relevancy analyzer, at least one field name of the one or more compare key fields and the one or more compare data fields with at least one field name of the one or more core key fields wherein each matching field name is one of one or more target key field candidates;
   determining, by the data relevancy analyzer, one or more shared key fields based on a correlation of the one or more target key field candidates and the one or more target data fields;
   categorizing, by the data relevancy analyzer, the one or more compare datasets into a direct related dataset pool and an indirect related dataset pool wherein the direct related dataset pool comprises one or more compare datasets comprising at least one of the one or more shared key fields;
   transforming, by the data relevancy analyzer, the direct related dataset pool and the core dataset into one or more reduction datasets based on a statistical measure of values of the one or more target data fields, the one or more shared key fields and the one or more compare data fields;
   creating, by the data relevancy analyzer, one or more target correlation of the one or more reduction datasets based on one or more reduction compare data fields and one or more reduction target data fields;
   processing, by the data relevancy analyzer, the indirect related dataset pool such that a plurality of datasets comprising the direct related dataset pool are processed as a next core dataset and the indirect related dataset pool is processed as the one or more compare datasets and wherein the one or more core key fields are the one or more reduction compare data fields;
   creating, by the data relevancy analyzer, one or more statistical relationship strength of the core dataset and the direct related dataset pool based on a statistical mean of the one or more target correlation of the one or more reduction datasets; and
   creating, by the data relevancy analyzer, a relevancy data store wherein the relevancy data store comprises the one or more statistical relationship strength, the one or more target correlation, the one or more compare data fields and the one or more shared key fields associated with the core dataset and the direct related dataset pool.

2. The method of claim 1, wherein the one or more reduction datasets further comprises statistical measure of values of the one or more target data fields, the one or more compare data fields and the one or more shared key fields having at least one of a statistical mean and a statistical mode based on a data type of the one or more target data fields, the one or more compare data fields and the one or more shared key fields.

3. The method of claim 1, wherein the one or more reduction datasets are filtered by at least one of a predetermined threshold and a predetermined data quantity limit.

4. The method of claim 1, wherein the one or more shared key fields are filtered by at least one of a predetermined threshold and a predetermined data quantity limit.

5. The method of claim 1, wherein the one or more statistical relationship strength are filtered by at least one of a predetermined threshold and a predetermined data quantity limit.

6. The method of claim 1, wherein one of the one or more compare datasets associated with the direct related dataset pool is categorized in the indirect related dataset pool based on a predetermined correlation value.

7. A computer program product for discovery of relevant data in massive datasets, the computer program product comprising:
one or more non-transitory computer readable storage media and program instructions stored on the one or more non-transitory computer readable storage media, the program instructions comprising:
program instructions to, receive, by data relevancy analyzer, one or more compare datasets wherein the one or more compare datasets comprises one or more compare key fields and one or more compare data fields;
program instructions to, receive, by the data relevancy analyzer, a core dataset wherein the core dataset comprises one or more target data fields and one or more core key fields for determining data relevancy with the one or more compare datasets;
program instructions to, match, by the data relevancy analyzer, at least one field name of the one or more compare key fields and the one or more compare data fields with at least one field name of the one or more core key fields wherein each matching field name is one of one or more target key field candidates;
program instructions to, determine, by the data relevancy analyzer, one or more shared key fields based on a correlation of the one or more target key field candidates and the one or more target data fields;
program instructions to, categorize, by the data relevancy analyzer, the one or more compare datasets into a direct related dataset pool and an indirect related dataset pool wherein the direct related dataset pool comprises one or more compare datasets comprising at least one of the one or more shared key fields;
program instructions to, transform, by the data relevancy analyzer, the direct related dataset pool and the core dataset into one or more reduction datasets based on a statistical measure of values of the one or more target data fields, the one or more shared key fields and the one or more compare data fields;
program instructions to, create, by the data relevancy analyzer, one or more target correlation of the one or more reduction datasets based on one or more reduction compare data fields and one or more reduction target data fields;
program instructions to, process, by the data relevancy analyzer, the indirect related dataset pool is processed such that a plurality of datasets comprising the direct related dataset pool are processed as a next core dataset and the indirect related dataset pool is processed as the one or more compare datasets and wherein the one or more core key fields are the one or more reduction compare data fields;
program instructions to, create, by the data relevancy analyzer, one or more statistical relationship strength of the core dataset and the direct related dataset pool based on a statistical mean of the one or more target correlation of the one or more reduction datasets; and
program instructions to, create, by the data relevancy analyzer, a relevancy data store wherein the relevancy data store comprises the one or more statistical relationship strength, the one or more target correlation, the one or more compare data fields and the one or more shared key fields associated with the core dataset and the direct related dataset pool.

8. The computer program product of claim 7, wherein the one or more reduction datasets further comprises statistical measure of values of the one or more target data fields, the one or more compare data fields and the one or more shared key fields having at least one of a statistical mean and a statistical mode based on a data type of the one or more target data fields, the one or more compare data fields and the one or more shared key fields.

9. The computer program product of claim 7, wherein the one or more reduction datasets are filtered by at least one of a predetermined threshold and a predetermined data quantity limit.

10. The computer program product of claim 7, wherein the one or more shared key fields are filtered by at least one of a predetermined threshold and a predetermined data quantity limit.

11. The computer program product of claim 7, wherein the one or more statistical relationship strength are filtered by at least one of a predetermined threshold and a predetermined data quantity limit.

12. The computer program product of claim 7, wherein one of the one or more compare datasets associated with the direct related dataset pool is categorized in the indirect related dataset pool based on a predetermined correlation value.

13. A computer system for discovery of relevant data in massive datasets, the computer system comprising:
one or more computer processors;
one or more non-transitory computer readable storage media;
program instructions stored on the one or more non-transitory computer readable storage media for execution by at least one of the one or more computer processors, the program instructions comprising:
program instructions to, receive, by data relevancy analyzer, one or more compare datasets wherein the one or more compare datasets comprises one or more compare key fields and one or more compare data fields;
program instructions to, receive, by the data relevancy analyzer, a core dataset wherein the core dataset comprises one or more target data fields and one or more core key fields for determining data relevancy with the one or more compare datasets;
program instructions to, match, by the data relevancy analyzer, at least one field name of the one or more compare key fields and the one or more compare data fields with at least one field name of the one or more core key fields wherein each matching field name is one of one or more target key field candidates;
program instructions to, determine, by the data relevancy analyzer, one or more shared key fields based on a correlation of the one or more target key field candidates and the one or more target data fields;
program instructions to, categorize, by the data relevancy analyzer, the one or more compare datasets into a direct related dataset pool and an indirect related dataset pool wherein the direct related dataset pool comprises one or more compare datasets comprising at least one of the one or more shared key fields;

program instructions to, transform, by the data relevancy analyzer, the direct related dataset pool and the core dataset into one or more reduction datasets based on a statistical measure of values of the one or more target data fields, the one or more shared key fields and the one or more compare data fields;

program instructions to, create, by the data relevancy analyzer, one or more target correlation of the one or more reduction datasets based on one or more reduction compare data fields and one or more reduction target data fields;

program instructions to, process, by the data relevancy analyzer, the indirect related dataset pool is processed such that a plurality of datasets comprising the direct related dataset pool are processed as a next core dataset and the indirect related dataset pool is processed as the one or more compare datasets and wherein the one or more core key fields are the one or more reduction compare data fields;

program instructions to, create, by the data relevancy analyzer, one or more statistical relationship strength of the core dataset and the direct related dataset pool based on a statistical mean of the one or more target correlation of the one or more reduction datasets; and program instructions to, create, by the data relevancy analyzer, a relevancy data store wherein the relevancy data store comprises the one or more statistical relationship strength, the one or more target correlation, the one or more compare data fields and the one or more shared key fields associated with the core dataset and the direct related dataset pool.

14. The computer system of claim 13, wherein the one or more reduction datasets further comprises statistical measure of values of the one or more target data fields, the one or more compare data fields and the one or more shared key fields having at least one of a statistical mean and a statistical mode based on a data type of the one or more target data fields, the one or more compare data fields and the one or more shared key fields.

15. The computer system of claim 13, wherein the one or more reduction datasets are filtered by at least one of a predetermined threshold and a predetermined data quantity limit.

16. The computer system of claim 13, wherein the one or more shared key fields are filtered by at least one of a predetermined threshold and a predetermined data quantity limit.

17. The computer system of claim 13, wherein the one or more statistical relationship strength are filtered by at least one of a predetermined threshold and a predetermined data quantity limit.

18. The computer system of claim 13, wherein one of the one or more compare datasets associated with the direct related dataset pool is categorized in the indirect related dataset pool based on a predetermined correlation value.

* * * * *